No. 665,465. Patented Jan. 8, 1901.
P. M. PRENTICE.
CULTIVATOR AND PLANTER.
(Application filed July 5, 1900.)
(No Model.) 2 Sheets—Sheet 1.
Fig. 1.
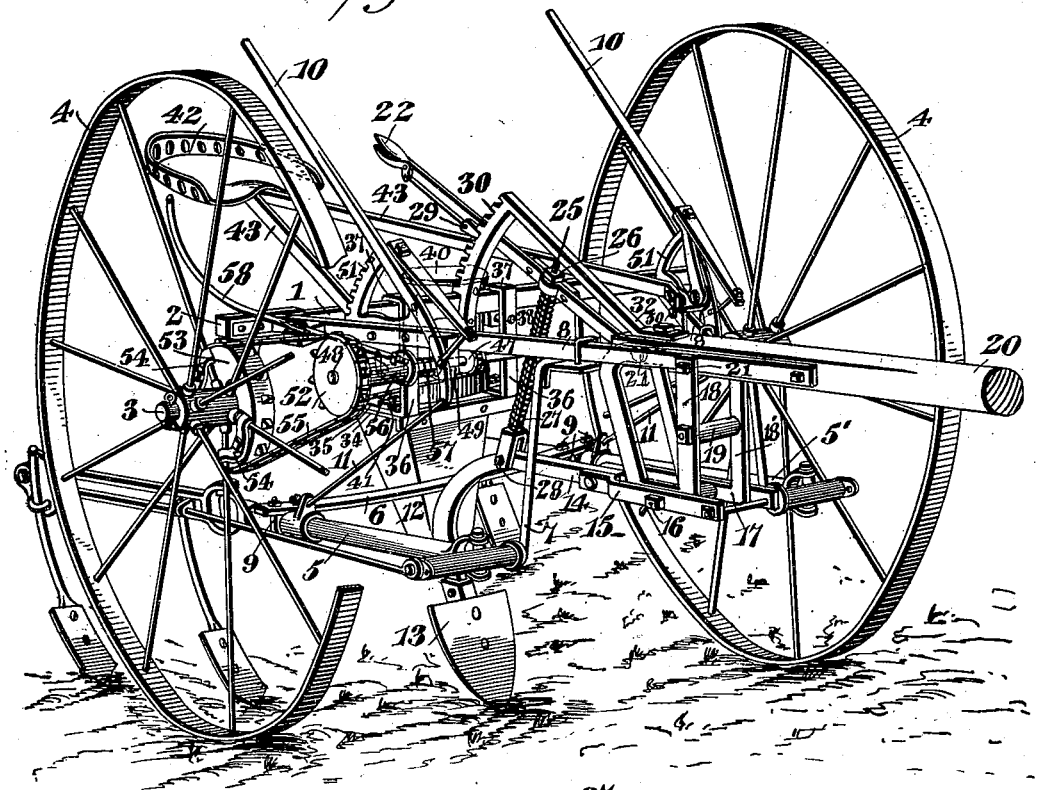
Fig. 3.
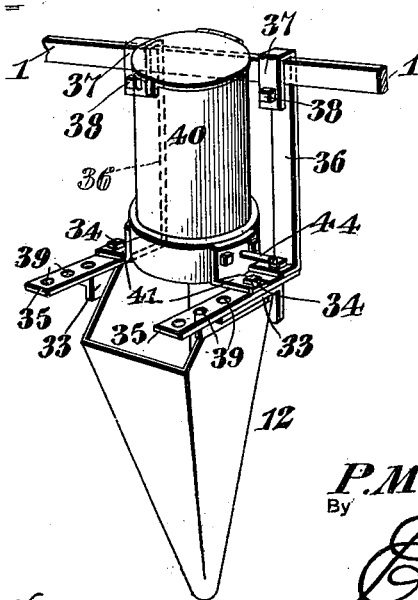
Witnesses
Jas. K. McCachran
Louis G. Julihn
P. M. Prentice, Inventor
By 
Attorney

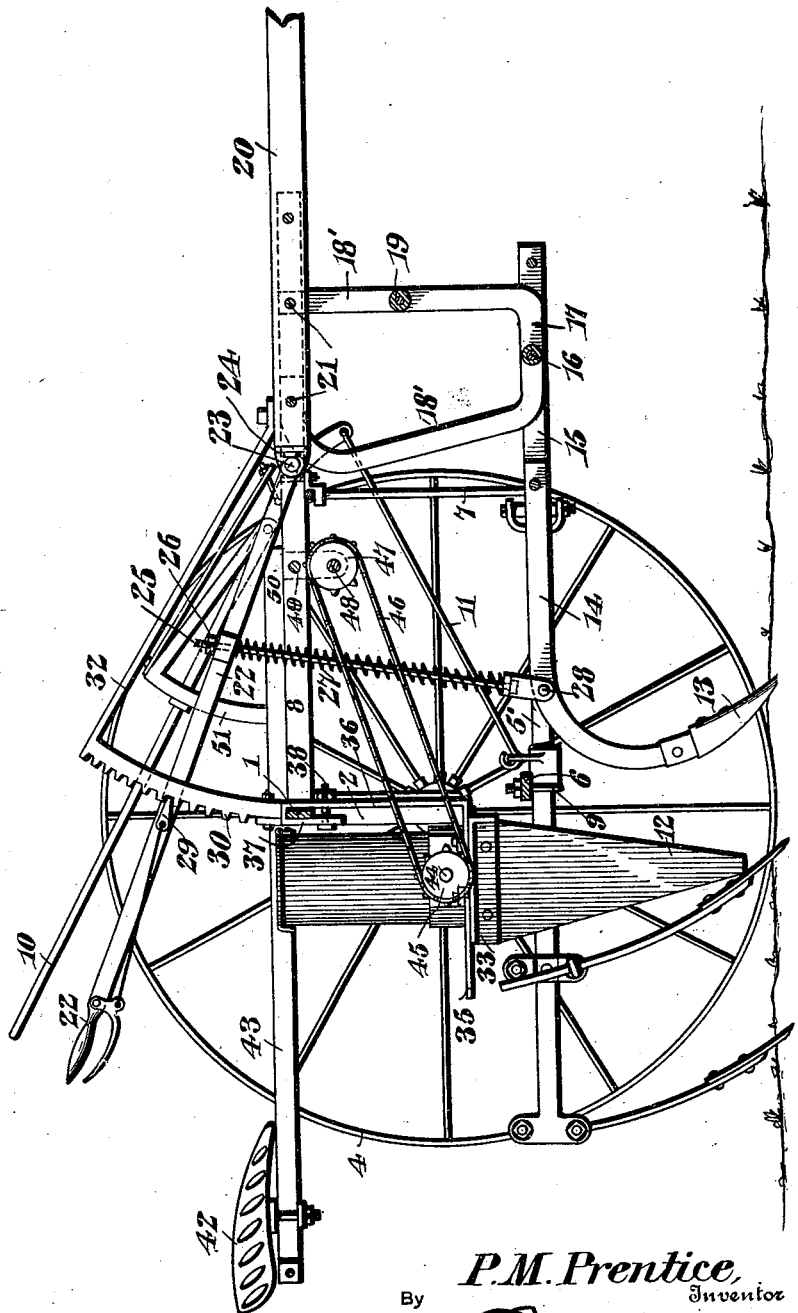

UNITED STATES PATENT OFFICE.

PETER MACK PRENTICE, OF WHITNEY, TEXAS.

CULTIVATOR AND PLANTER.

SPECIFICATION forming part of Letters Patent No. 665,465, dated January 8, 1901.

Application filed July 5, 1900. Serial No. 22,590. (No model.)

*To all whom it may concern:*

Be it known that I, PETER MACK PRENTICE, a citizen of the United States, residing at Whitney, in the county of Hill and State of Texas, have invented a new and useful Cultivator and Planter, of which the following is a specification.

My invention relates to improvements in combined cultivators and corn and cotton planters; and one object is to provide means for facilitating the adaptation of an ordinary cultivator for the planting of corn or cotton seed.

A further object of the invention is to provide means for attaching various types of seedboxes to the cultivator and to provide a novel form of mounting for the seed or dropper tube which will permit the latter to be adjusted horizontally to obtain any desired relation between the seed-tube and a furrow-opener, this adjustability being desirable, particularly when the device is adapted for planting various classes of seeds and where it is necessary to provide for various vertical adjustments of the opener, which are necessitated by the character of the ground being worked or the character of the planting or cultivating being done.

A still further object of the invention is to provide a novel and exceedingly simple and substantial means for mounting the furrow-opener and for effecting the adjustments of the latter, while permitting it to yield sufficiently to prevent breakage whenever progress of the machine is impeded by the contact of the opener with a stump or other obstruction.

With these and other ends in view my invention consists in the novel construction and arrangement of parts, which will be hereinafter described and claimed and illustrated in the accompanying drawings, in which—

Figure 1 is a perspective view of a riding cultivator and planter constructed in accordance with my invention. Fig. 2 is a central vertical sectional view of the same, certain of the parts being shown in full lines. Fig. 3 is a detail perspective view illustrating the mounting of the seed box and tube.

Referring to the numerals of reference employed to designate corresponding parts in the several views, 1 indicates the usual carrying-axle of the cultivator equipped with terminal hangers 2, which sustain the spindles 3, that accommodate the carrying-wheels 4 of the implement. The shovel or plow beams 5 and 5' are connected and spaced by a transverse bar or strut 6 and are supported at their front ends by the usual beam-hanger 7, supported by the main frame 8 of the machine. The beam-connecting bar 6 is connected to the beams in any suitable manner, but preferably by means of U-shaped clips 9, which serve to permit independent axial movement of the beams and permit said beams to be adjusted independently by means of the beam-adjusting levers 10, located at opposite sides of the frames 8 and having their lower ends connected to the beams 5 and 5' by means of connecting-rods 11 in a manner well understood in the art.

Immediately in front of the dropper-tube 12 is located an independently-mounted furrow-opener or opening-plow 13, carried at the foot of a curved opener-beam 14, the front end of which is disposed horizontally and is formed with terminal bifurcations 15, pierced by a pivot-bolt 16, which serves to pivotally sustain the beam 14 and passes through the bottom rails 17 of a pair of twin beam-supporting frames 18 and 18', spaced by intermediate spacing-bolts 19 and secured to the opposite sides of the machine-tongue 20, as by bolts 21. The frames 18 and 18' are preferably formed from stout metal bars, and the rails 17 thereof are located in parallel relation and in contact with the inner faces of the bifurcations 15 of the opener-beam 14 in order to constitute a pivotal support for the beam and to prevent lateral movement or twisting of said beam when the furrow-opener is in use.

In order to prevent breakage of the opener-plow and to provide for the vertical adjustment of the latter to accommodate the machine to various kinds of work and to permit the plow to be raised out of contact with the ground when the machine is being transported from place to place, I provide an adjusting-lever 22, fulcrumed at its forward end upon a bolt 23, mounted in a bracket 24 upon the rear end of the tongue 20. This lever is pierced at an intermediate point for the passage of a rod 25, having a nut 26 screwed upon its upper end and encircled below the lever by a coiled spring 27, bearing at its lower end against a projection upon the rod, preferably formed by the bifurcated end of the latter, which straddles the beam 14 and is pivotally connected thereto by a bolt 28, arranged in a manner to permit relative pivotal movement of the beam and rod. The lever 22 is designed to be retained in its adjusted position by a spring-latch 29, movable over the notched face of the segmental rack or quadrant 30, having its lower end supported by the carrying-axle 1 and provided with an oblique frame-bar 32, extending forwardly from its upper end and bolted or otherwise secured upon the rear end of the tongue 20. It will now be seen that the furrow-opener will always be urged toward the ground by the spring 27, but will yield when obstructed by a root or the like, because the rod 25 is free to slide through the lever 22. Any slight adjustment of the opener is obtained by screwing the nut 26 farther on the rod 25 or nearer to the end thereof, as the case may be, and greater adjustments are obtained by swinging the beam-adjusting lever 22 to any desired position upon the rack 30, where it is held by the spring-latch 29.

The dropper-tube 12 is, as stated, located in the rear of the opening-plow 13, and by reference to Fig. 3 of the drawings the novel mounting of this tube will be seen. This tube is of substantially ordinary form, except that at its upper end it is provided with horizontal bolt-flanges 33, designed to be bolted by bolts 34 to the under sides of a pair of horizontal arms 35, constituting the lower ends of a pair of independent planter-supporting brackets 36, substantially L-shaped and having their upper ends recurved to form hooks 37, which take over the carrying-axle 1 and are designed to be adjustably retained thereon by bolts 38, passing through the brackets and the ends of the hooks to close the throats of the latter. The adjustment of the tube 12 toward or from the furrow-opener is obtained by passing the bolts 34 through any hole of the series of holes 39, provided in each of the horizontal arms 35 of the brackets.

Mounted upon the arms 35, above the dropper-tube 12, and preferably secured by the bolts 34, which serve to secure the tube, is a seedbox 40, of any approved form, having foot-plates 41, resting upon the arms 35. The seedbox and dropper-tube constitute the primary elements of the planting mechanism, and it is for this reason that I have termed the brackets 36 "planter-supporting" brackets, inasmuch as they serve to effect the support of the planting mechanism from the carrying-axle 1 exclusively and in an unobtrusive position below the frame of the machine and between the axle and the operator's seat 42, carried, as usual, by the frame-bars 43.

The feed of the seeds from the seedbox to the seed or dropper tube 12 is effected by feed-regulating mechanism of ordinary form located within the box and comprehending a feed or operating shaft 44, extending through the wall of the box and having keyed thereon a sprocket-wheel 45, geared as by a sprocket-chain 46 to a sprocket-wheel 47, carried by a shaft 48, supported in advance of the axle 1 by bearings 49, retained upon the frame of the machine by bolts 50, which also serve to retain the toothed quadrants 51, employed in connection with the beam-adjusting levers 10. The shaft 48 carries upon one end a sprocket-wheel 52, mounted to revolve loosely on the shaft and designed to be driven by a driving-sprocket wheel 53, fixed upon the hub of one of the carrying-wheels 4 by curved spoke-clamps 54, bolted to the wheel 53, and embracing the spokes of the carrying-wheel, as illustrated in Fig. 1 of the drawings. The connection between the wheels 52 and 53 is effected by means of a sprocket-chain 55, and the hub of the wheel 52 is provided with a clutch-face designed to be engaged by a clutch-collar 56, keyed upon the shaft 48 and normally urged into engagement with the hub of the wheel 52 by a spring 57, backed by the adjacent bearing 49. The clutch-collar 56 is designed to be thrown into or out of engagement with the wheel 52 for the purpose of throwing the planting mechanism out of gear by means of a clutch-lever 58, fulcrumed upon the frame of the machine and connected at its front end to the collar 56 and having its rear end or handle located in proximity to the seat 42 to permit the operator to throw the feed or planting mechanism into or out of operative relation with the driving and carrying wheel at will.

The brackets 36 constitute an important feature of my invention, since they detachably retain the seedbox and dropper-tube suspended from the axle 1. They furthermore permit the dropper-tube to be adjusted horizontally, and as they are themselves capable of adjustment upon the axle 1 they may be quickly positioned for the purpose of supporting a seedbox of any desired character or seedboxes of different sizes, which is of great advantage, because a machine of this character is intended for general cultivating and planting purposes and for use in connection with soil of widely-varying character. The employment of the adjustable furrow-opener in lieu of the usual shoe attached to the dropper-tube enables the depth of the furrow to be regulated between wide limits and the provision of the double adjustment—that is to say, the minor adjustment, which is obtained through the movement of the nut 26 and the major adjustment obtained by the manipulation of the lever 22, permits the opener to be adjusted to assume a normal position with particular reference to the character of the ground, and at the same time makes it possible for the operator to elevate or depress the opener to accommodate the various conditions which may arise during the travel of the machine over the field or from one point of use to another.

Another essential advantage of the particular arrangement described is that corn or cotton may be plowed and replanted at the same time and bedded or level ground may be cultivated with equal facility.

The manipulation of my device in use is as follows: The machine being organized as shown in Fig. 1 of the drawings, the levers 10 are adjusted to secure the proper penetration of the covering-plows carried by the beams 5 and 5'. The nut 26 is next adjusted upon the rod 25 to secure the desired compression of the spring 27 in accordance with the nature of the soil. The lever 22 is then adjusted upon the segment 30 for the purpose of adjusting the penetration of the furrow-opener, and the spring 57 having forced the clutch-collar 56 into engagement with the hub of the wheel 52 the machine is ready to be drawn over the field. As the cultivator advances the opener 13 provides a planting-furrow of the desired depth, and the seeds having been dropped into the furrow in the rear of the furrow-opener are covered by the covering-plows in the usual manner. If now the opener should strike a stump suddenly or other positive resistance, it will swing upwardly upon its pivot against the resistance of the spring 27, and having cleared the obstruction without breakage will be restored to its normal position by the spring. If, as is sometimes the case in working large fields, a strip of poor ground is reached, necessitating the deepening of the furrow, the lever 22 is swung down and secured in a lower position upon the rack for the purpose of securing a greater penetration of the opener 13, and when the planting has been completed and it is desired to remove the machine either to the barn or any other point of use the levers 10 and 22 are elevated to effect the elevation of the covering-plows and opener out of effective proximity to the ground and the lever 58 is swung laterally to release the clutch-collar 56 from the hub of the wheel 52 to throw the planting mechanism out of gear. In this organization of the device the wheels 4 constitute merely a pair of carrying-wheels, facilitating the transportation of the machine without affecting the cultivating implements or planting mechanism.

From the foregoing it will appear that I have produced a cultivator and planter of simple and efficient construction and by means of which the various objects sought to be attained are accomplished; but while the construction and arrangement illustrated and described are believed at this time to be preferable I do not wish to be understood as limiting myself to the structural details defined, but reserve the right to effect such changes, modifications, and variations as may be comprehended by the spirit of the invention.

What I claim is—

1. The combination with a cultivator-frame, carrying-wheels and an axle, of a pair of pendent supporting-brackets carried by a horizontal portion of the axle and capable of independent lateral adjustment thereon, of a seedbox and dropper-tube adjustably and removably carried by the brackets, whereby said elements may be adjusted toward or from the axle or may be removed from the brackets to permit relative adjustment of the latter for the purpose of accommodating seedboxes of varying sizes.

2. The combination with a cultivator-frame, carrying-wheels and axle, of a pair of bearing-brackets pendent from the axle and having horizontal portions extending rearwardly at their lower ends, and a seedbox and dropper-tube mounted upon the horizontal portions of the brackets and adjustable thereon toward or from the axle.

3. The combination with a cultivator-frame, carrying-wheels and axle, of a pair of independently-adjustable brackets pendent from a horizontal portion of the axle and having their lower ends extended rearwardly in a horizontal plane, a feed-box mounted upon the horizontal ends of the hangers, a dropper-tube secured to the under sides of said horizontal ends, and securing means common to the feed-box and dropper-tube and arranged to permit said elements to be adjusted horizontally toward or from the axle.

4. The combination with a cultivator-frame, carrying-wheels and an axle, of a pair of angular bearing-brackets provided with hooked ends engaging the axle, a dropper-tube provided with bolt-flanges, a seedbox provided with foot-plates, and bolts passing through horizontal portions of the brackets and through the bolt-flanges and foot-plates of the dropper-tube and seedbox.

5. The combination with a cultivator-frame, carrying-wheels and an axle, of a seedbox and dropper-tube supported by the axle, feed mechanism carried by the seedbox, a shaft carried by the frame in front of the seedbox, gearing operatively connecting said shaft with one of the carrying-wheels, gearing likewise connecting said shaft with the feed mechanism, a clutch controlling the effective relation of the shaft with the carrying-wheel to which it is geared, and a pivoted lever controlling the operation of the clutch and extended rearwardly beyond the axle.

6. The combination with a cultivator-frame, carrying-wheels and an axle, of a seedbox and dropper-tube, feed mechanism carried by the seedbox and comprehending a sprocket-wheel located upon the exterior thereof, a shaft carried by the frame in advance of the seedbox and geared to the sprocket-wheel of the feed mechanism, a sprocket-wheel loosely mounted on said shaft, a clutch designed to effect the engagement of said wheel to the shaft or its disengagement therefrom, a driving sprocket-wheel geared to the sprocket-wheel on the shaft, and curved clips bolted to the driving-sprocket and clamping the spokes of one of the carrying-wheels.

7. The combination with a cultivator-frame, carrying-wheels and tongue, of a pair of spaced beam-supporting frames depending from the tongue, an opener-beam provided with an opening element at one end and having its opposite end bifurcated, said bifurcations being disposed against the outer faces of the supporting-frames, a pivot-bolt piercing the bifurcated ends of the opener-beam and the supporting-frames, and means for sustaining the end of the beam opposite the frames.

8. The combination with a cultivator-frame, carrying-wheels and a tongue, of a pair of identical spaced beam-supporting frames depending from the opposite sides of the tongue and comprising horizontal bottom rails, an opener-beam having one end bifurcated and having its bifurcations in contact with the outer faces of the frames, a pivot-bolt piercing said bifurcations and the bottom rails of the frames, an opener-plow carried by the beam at its rear end, and means for adjustably retaining the beam.

9. The combination with a cultivator-frame and carrying-wheels, of a tongue, a pair of twin supporting-frames depending from the opposite sides of the tongue, a furrow-opener beam having a bifurcated end embracing said frames and pivotally connected thereto, a furrow-opener adjusting-lever mounted upon the frame, means for retaining said lever in its adjusted positions, a rod pivotally connected at one end to the furrow-opener and passed loosely through the lever, a nut screwed upon the upper end of said rod, and a spring bearing at its opposite ends against the lever and against a projection on the rod and exerting its pressure to swing the opener-beam in the direction of the ground.

In testimony that I claim the foregoing as my own I have hereto affixed my signature in the presence of two witnesses.

PETER MACK PRENTICE.

Witnesses:
A. F. ACKERMAN,
W. F. TREAT.